US007303623B2

(12) United States Patent
Bailey

(10) Patent No.: US 7,303,623 B2
(45) Date of Patent: Dec. 4, 2007

(54) PELLETING LIME FINES WITH ASPHALT ENHANCING BINDERS AND METHODS OF USE IN ASPHALT MANUFACTURING

(76) Inventor: William R. Bailey, 5620 Ocean Pines Cir., Las Vegas, NV (US) 89130

( * ) Notice: Subject to any disclaimer, the term of this patent is extended or adjusted under 35 U.S.C. 154(b) by 0 days.

(21) Appl. No.: 11/134,797

(22) Filed: May 20, 2005

(65) Prior Publication Data
US 2006/0260508 A1 Nov. 23, 2006

(51) Int. Cl.
*C09C 1/02* (2006.01)
*C04B 2/02* (2006.01)
*C08K 3/20* (2006.01)

(52) U.S. Cl. .................. 106/461; 106/471; 106/659; 106/668; 106/671; 106/792; 106/795; 106/800; 524/418; 524/433; 428/402

(58) Field of Classification Search ........... 106/123.11, 106/123.13, 157.1, 157.9, 217.8, 217.9, 284.01, 106/284.04, 287.35, 500, 501.1, 502, 823, 106/659, 668, 671, 220, 471, 461, 371, 792, 106/795, 800; 524/418, 433; 428/402
See application file for complete search history.

(56) References Cited

U.S. PATENT DOCUMENTS

| 2,279,617 | A | * | 4/1942 | Lewis | 75/321 |
|---|---|---|---|---|---|
| 3,634,114 | A | * | 1/1972 | Lufcy | 501/109 |
| 3,876,439 | A | | 4/1975 | Schneider | |
| 4,094,697 | A | | 6/1978 | Rostler | |
| 4,256,491 | A | * | 3/1981 | Tate | 106/2 |
| 4,547,224 | A | | 10/1985 | Schilling | |
| 4,561,901 | A | | 12/1985 | Schilling | |
| 4,756,763 | A | | 7/1988 | Etnyre | |
| 4,925,616 | A | * | 5/1990 | Brown et al. | 264/262 |
| 5,004,799 | A | | 4/1991 | Kohls et al. | |
| 5,137,753 | A | | 8/1992 | Bland et al. | |
| 5,306,327 | A | | 4/1994 | Dingeman et al. | |
| 5,743,934 | A | | 4/1998 | Wommack et al. | |
| 5,824,244 | A | | 10/1998 | Kelly et al. | |
| 5,997,599 | A | | 12/1999 | Wommack et al. | |
| 6,027,558 | A | | 2/2000 | Little et al. | |
| 6,514,334 | B1 | | 2/2003 | Perry et al. | |
| 6,613,138 | B2 | | 9/2003 | Welshimer et al. | |
| 6,824,600 | B2 | | 11/2004 | Bailey et al. | |
| 2003/0037704 | A1 | | 2/2003 | Bailey et al. | |

FOREIGN PATENT DOCUMENTS

SU 985095 * 12/1982

OTHER PUBLICATIONS

Kokina et al, Derwent Acc. No. 1985-097199,"Organic-mineral cold laid road surfacing composition . . . ", (1985) Abstract of SU 3484162 (Aug. 24, 1982).*
Sabinin et al, Derwent Acc. No. 1983-800204, "Charge for pelletizing metallurgical charge . . . ", (1983) Abstract of SU 3330850 (Aug. 14, 1981).*
English Translation of Russian (USSR) Publication No. SU 1,114,682A, to Kokina et al., Published Sep. 23, 1984 (Appl. No. 3484162 (Aug. 24, 1982)).
English Translation of Russian (USSR) Publication No. 985,095, to Sabinin et al. Published Dec. 30, 1982 (Appl. No. SU 3330851 (Aug. 14, 1981)).

* cited by examiner

*Primary Examiner*—David M Brunsman
(74) *Attorney, Agent, or Firm*—Workman Nydegger

(57) ABSTRACT

A lime pellet for use in asphalt applications can include lime fines and an asphalt-compatible binder. The pellet is characterized as having a rigid structure with a dimension greater than about 1.5 mm and being compatible with a hot mix asphalt so as to dissolve in liquid asphalt. Optionally, the binder is characterized by having less than about 50% by weight of total binder being sulfur, or the pellet is characterized by having lime in an amount of at least 31% by weight, or being storage-stable and agglomeration resistant. The pellet is manufactured by mixing the lime fines with the asphalt-compatible binder and forming pellets therefrom. The pellets are useful for conditioning an end product of hot mix asphalt during the manufacture of such an asphalt. The method of conditioning includes providing the lime pellet, and mixing the lime pellet with a hot mix asphalt ingredient, wherein the ingredient is at least one of an aggregate or asphalt cement. Additionally, the lime pellets can be used for bonding a first asphalt layer with a second asphalt layer by being deposited therebetween.

28 Claims, 4 Drawing Sheets

PELLETING LIME FINES WITH ASPHALT ENHANCING BINDERS AND METHODS OF USE IN ASPHALT MANUFACTURING

BACKGROUND OF THE INVENTION

1. The Field of the Invention

The present invention relates to lime pellets for use in asphalt applications. More particularly, the present invention relates to compositions and methods of manufacturing lime pellets, and methods of using lime pellets in asphalt manufacturing and paving.

2. The Related Technology

Asphalt pavements are well-known and have been used for many years. Typically, an asphalt pavement includes an aggregate and asphalt cement mixed together in what is commonly referred to as hot mix asphalt (HMA). The asphalt cement is a hydrocarbon-rich substance such as, or prepared from, bitumen, and is used to bind the aggregate into a pavement. The type and amount of aggregate can vary, and it provides structural reinforcement and durability to the HMA. While the asphalt cement functions as a continuous phase that binds the aggregate materials together, it is well known that various additives such as lime can be used to improve the durability and longevity of asphalt pavements.

Traditionally, lime fines have been used in treating HMA ingredients in order to improve the long-term interactions or bonds between the asphalt cement and aggregate. Such improvements have included anti-strip characteristics and reduced deformation or softening of the asphalt pavement over time. These improvements have been obtained by either combining the lime fines with the aggregate or with the asphalt cement before the aggregate and asphalt cement have been prepared into hot mix asphalt. It is thought, without being bound thereto, that lime improves the physical characteristics of the asphalt pavement by inhibiting any absorbed water from softening the pavement, and/or by enhancing the physical interface and bonding between the aggregates and the asphalt cement.

Typically, the lime fines have been added in bulk to one of the hot mix asphalt ingredients by well-known methodologies and techniques. More particularly, the powdered lime can be supplied by inline injection, or bulk dumping. While favorable asphalt pavement characteristics can be obtained by the current methodologies, problems have arisen from the lime fines clumping or becoming airborne, which jeopardizes the ability to accurately measure or control the amount of lime being used.

Additionally, lime fines have been identified as a health hazard because the particulates are easily airborne and can be breathed into a person's lungs. People working directly with the lime mixing process, as well as those in surrounding areas, have been exposed to the airborne lime fines that travel throughout a processing or construction site. In part, this is because the lime fines can become airborne during transportation, loading, unloading, and while being used in the manufacturing process. When lime fines are breathed into the lungs, oxygen is depleted so as to cause suffocation or asphyxiation. While actual death may not be a common result of such suffocation, constant or repeated inhalation of particulate materials can have serious negative long-term implications such as emphysema, pneumonia, chronic bronchitis, and even lung cancer.

Moreover, the use of lime fines to marinate the aggregate has also caused other health-related complications. This is because the powdered lime fines are usually combined with the aggregate and allowed to sit on the ground for weeks or months. As a result, the lime fines have leached into the groundwater and flowed into neighboring aquifers. The presence of lime fines in the water kills fish, and can contaminate drinking water.

Furthermore, the use of lime fines has caused problems with manufacturing and construction equipment. Again, this is at least partially a consequence of the small particulate nature of such lime fines (e.g., smaller than 200 mesh), which allows clouds of the particulates to float or circulate around construction sites and asphalt manufacturing facilities. The small particulates eventually deposit on the machinery or equipment and become entrained within joints and other moving parts. The particles cause excessive wear and fatigue, and result in the equipment wearing out prematurely. Specifically, problems have arisen from the lime fines being sucked into the bags of baghouses so as to foul the bags and render them unusable.

Therefore, it would be advantageous to have a lime product that can be used during the manufacture of HMA and pavement that is not a fine powder. Additionally, it would be beneficial to have a method of processing lime fines into a more manageable form so as to improve their use in asphalt manufacturing and paving with minimal health and cost concerns associated with such small particulates.

BRIEF SUMMARY OF THE INVENTION

The present invention has been developed in response to the present state of the art, and in particular, in response to problems and needs that have not been solved.

In one embodiment, the present invention includes a lime pellet for use in asphalt manufacturing. The pellet is comprised of lime fines such as calcium hydroxide ($Ca(OH)_2$) fines and/or calcium oxide (CaO) fines, and an asphalt-compatible binder. The asphalt-compatible binder is mixed with the lime in an amount and disposition sufficient to form a pellet, wherein the pellet is characterized as having a rigid structure with a dimension greater than about 1.5 mm (about 0.05 inch). The lime pellet is compatible with a hot mix asphalt and/or asphalt cement and dissolvable in liquid asphalt.

In another embodiment, the present invention includes a lime-based pellet (calcium hydroxide and/or calcium oxide) that is characterized to have greater than 31% lime by weight of the pellet. In yet another embodiment, the lime-based pellet is characterized as being capable of dissolving in liquid asphalt in less than about 1 minute or less than about 30 seconds. In still another embodiment, the lime-based pellet is characterized by the binder having less than about 50% sulfur by weight of the total binder. In a further embodiment, the pellet is a storage-stable pellet that does not agglomerate with adjacent lime pellets when stored in bulk under ambient conditions.

These and other embodiments and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

Figure 1:
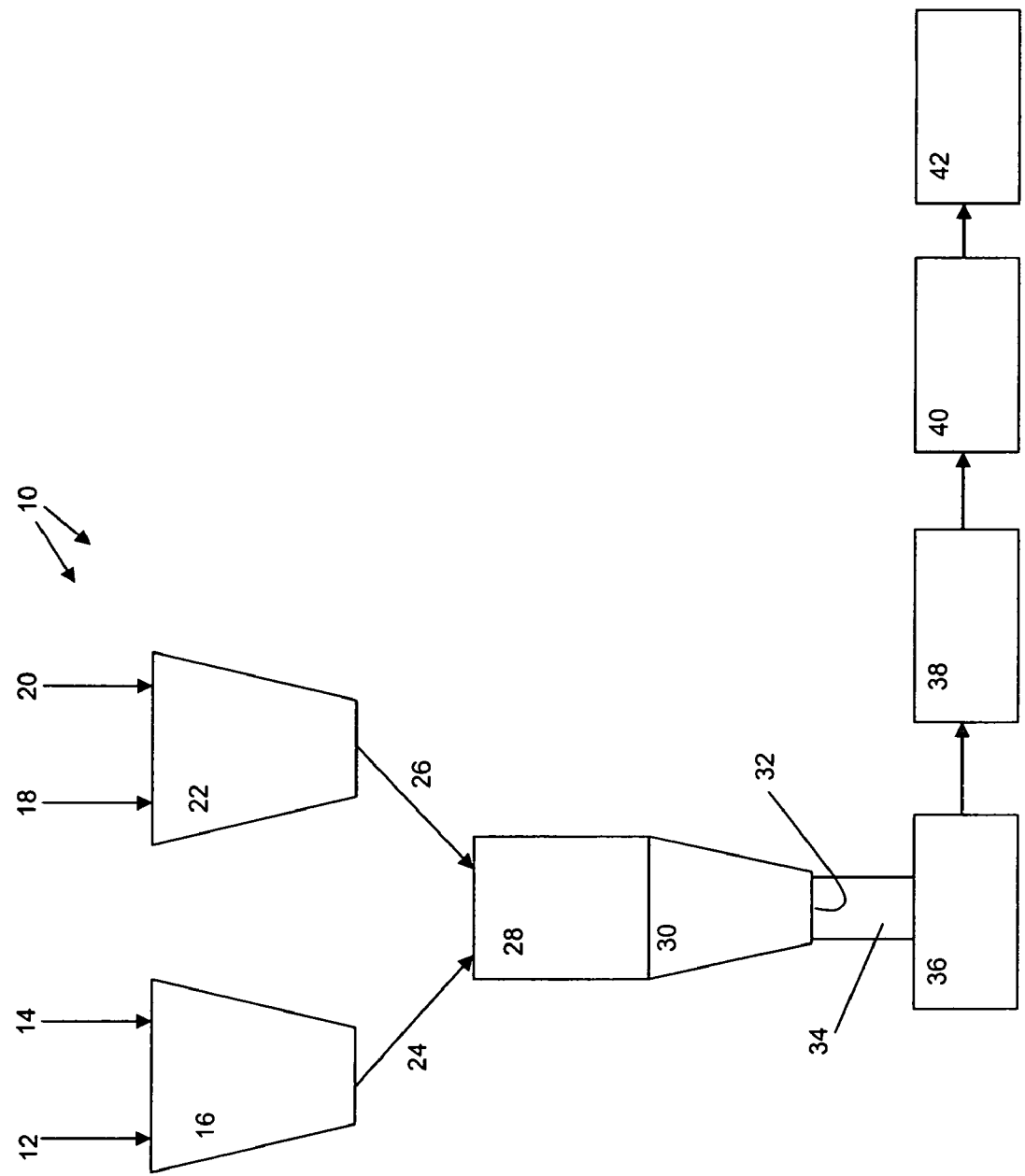
FIG. 1 is a schematic representation that illustrates an embodiment of a pelleting system and process for preparing lime-based pellets.

Generally, embodiments of the present invention are directed to the production and use of lime-based pellets for modifying asphalt compositions and pavements. The terminology employed herein is used for the purpose of describing particular embodiments only and is not intended to be limiting.

I. Definitions

As used herein, the term "lime" is meant to refer to calcium hydroxide ($Ca(OH)_2$) and/or calcium oxide (CaO); however, it is not meant to refer to limestone. As such, any reference to lime is meant to include compositions having calcium hydroxide or calcium oxide as well as compositions predominately comprised of calcium hydroxide or calcium oxide, and meant to specifically exclude limestone.

As used herein, the term "fines" is meant to refer to the small particulate nature of the lime powders used in hot asphalt mix production. As such, the lime fines are small, finely divided, and light weight particulates that are easily airborne when handled or exposed to minimal air currents.

As used herein, the term "storage-stable" is meant to refer to a physical characteristic that inhibits or prevents a pellet from degrading or combining with adjacent pellets under ambient conditions. That is, when under normal ambient conditions at a normal humidity, the pellets are form-stable. As such, when a plurality of storage-stable pellets are piled in storage, the individual pellets retain their distinct structural integrity without forming an agglomeration of pellets.

Concentrations, amounts, temperatures, dissolution rates, and other numerical data may be presented in a range format. It is to be understood that such a range format is used merely for convenience and brevity and should be interpreted flexibly to include not only the numerical values explicitly recited as the limits of the ranges, but also to include all the individual numerical values or sub-ranges encompassed within that range as if each numerical value and sub-range is explicitly recited. For example, bitumen can be present in the pellets as an asphalt-compatible binder at various compositions within a range of from about 10% to about 60% by dry weight. This recited range should be interpreted to include not only the explicitly recited limits of about 10% and about 60%, but also to include such individual compositional percentages such as 25%, 32%, 40%, 53%, and 59% as well as sub-ranges between these individual percentages. This interpretation should apply regardless of the breadth of the range or the characteristic being described, and should apply to ranges having both upper and lower numerical values as well as open-ended ranges reciting only one numerical value.

II. Lime Pellets

In accordance with an embodiment of the present invention, the lime-based pellets are prepared in a manner that binds lime fines into an asphalt-compatible binder. Embodiments of the methods for manufacturing lime pellets according to the present invention comprise mixing lime with an asphalt-compatible binder such as bitumen, tall oil pitch, lignosulfonate and the like, and subsequently forming pellets in the shape of pastilles, slates, chips, briquettes, or other small forms of the asphalt pavement conditioning and binding product.

The resulting pellets are suitable for storage and transportation at a wide range of ambient temperatures because of their rigid and non-flow properties. The pellets can be stored at the production site or at a remote site and can be transported and stored in piles or within containers such as sacks, tanks, and barrels.

The ability to store the pellets without degradation or agglomeration permits the accumulation of large quantities of pellets and shipment in large quantities to remote locations. The properties of the various embodiments of lime-based pellets according to the present invention are such that the pellets can effectively be shipped over long distances, such as by transatlantic and transcontinental shipments, by any one of a variety of conventional means, such as rail cars, trucks, ships, and airplane. Properties that facilitate the storage and shipment of the inventive lime-based pellets in large quantities include the rigid, non-sticky, non-aggregating, and non-flow properties that enable handling without the concerns associated with fines or particulates becoming airborne.

In one embodiment, the individual pellets are storage-stable so as to not agglomerate with adjacent pellets. For example, an individual pellet does not substantially degrade or agglomerate with adjacent pellets for a duration longer than about 30 days, more preferably longer than about 60 days, and most preferably longer than about 90 days. Moreover, some pellet configurations can be form-stable for longer than about 6 months or longer than about 12 months. As such, when pellets are stored at normal or natural ambient conditions and humidity, the individual pellets retain their form.

Embodiments of applications suitable for using the lime-based pellets according to the present invention include their use in hot mix plants where the asphalt pavement end product is produced for transportation and delivery to the paving site. Other applications of lime-based pellets according to the present invention include use in roadside paving operations, either alone or in combination with other paving materials.

Some embodiments of lime-based pellets according to the present invention are configured so as to protect asphalt pavement against water-induced detrimental effects, thus preventing or reducing undesirable effects that sometimes occur due to long-term exposure to precipitation such as rain, snow, and/or ice. Also, the pellets can prevent or inhibit oxidative age hardening of the asphalt pavement. Some embodiments of lime-based pellets according to the present invention are provided with components or modifiers that provide the dark or black colored asphalt pavement that is familiar and preferred.

In order to achieve the foregoing properties, it can be preferred that the lime-based pellets have a size that prevents them from becoming easily airborne due to wind currents or handling. It has been found that when the pellets are at least larger than 14 mesh so as to not pass therethrough, ease of use and handling greatly increases. For example, the pellets can have a dimension greater than about 1.5 mm (about 0.05 inch) to inhibit or prevent being passed through 14 mesh, more preferably to prevent being passed through 8 mesh, and most preferably to prevent being passed through 4 mesh.

Additionally, the shape of the pellets can be varied and still retain the foregoing properties. Examples of suitable pellet shapes include those that are substantially similar to spheroids, prills, pastilles, chips, cubes, tablets, slates, chunks, irregularly-shaped pellets, and the like.

In one embodiment, the pellets can be comprised of a shell and core. As such, a binder shell is formed around the lime-based core. Without being bound thereto, it is thought that by decreasing the amount of binder within the pellet, there is less binder available for the external surface area of the pellet. Accordingly, the binder is distributed in a manner that preferentially encapsulates the lime so as to form a shell-core pellet. Also, the shell-core pellets can increase the dissolution rate when introduced into liquefied asphalt cement.

III. Lime Pellet Compositions

A. Lime

In one embodiment, the pellets prepared in accordance with the present invention include calcium hydroxide ($Ca(OH)_2$). More particularly, the calcium hydroxide is presented as finely divided particulates that are held together in the pellet with a suitable binder. Calcium hydroxide is also known as calcium dihydroxide, calcium hydrate, lime hydrate, or hydrated lime. The calcium hydroxide fines can be produced by reacting water with calcium oxide in an atmospheric hydrator. Usually, calcium hydroxide is a white finely divided powder having an average diameter of less than about 0.15 mm so as to pass through 100 mesh. Additionally, calcium hydroxide fines can include traces of calcium oxide, magnesium oxide, calcium sulfate, ferric oxide, and silica. Moreover, in certain instances it can be preferred that the only lime component in the pellet is calcium hydroxide so as to be substantially devoid of calcium The inventive pellets can include calcium hydroxide in a variety of concentrations. In fact, some embodiments can include calcium hydroxide up to about 99% by weight of the pellet. For example, the pellets can include calcium hydroxide from about 1% to about 99%, more preferably from about 10% to about 90%, even more preferably from about 31% or 35% to about 85%, and most preferably from about 45% to about 75% by total weight of the pellet. A specific example of an inventive pellet includes calcium hydroxide at greater than 31% by total weight of the pellet.

In one embodiment, the pellets prepared in accordance with the present invention include calcium oxide (CaO). More particularly, the calcium oxide is presented as finely divided particulates that are held together in the pellet with a suitable binder. Calcium oxide is also known as calcium monoxide, quicklime, or burnt lime. Usually, calcium oxide is a white or slightly yellowish finely divided powder. Additionally, calcium oxide fines can include traces of magnesium oxide, ferric oxide, and silicon oxide. Calcium oxide is a basic anhydride, and reacts with water to form calcium hydroxide. Moreover, in certain instances it can be preferred that the only lime component in the pellet is calcium oxide so as to be substantially devoid of calcium hydroxide. The inventive pellets can include calcium oxide in a variety of concentrations including those similar to calcium hydroxide.

Additionally, in some embodiments and/or applications it can be preferred to have lime-based pellets that are comprised of both calcium hydroxide and calcium oxide. This enables the pellets to provide the benefits of both chemicals to the asphalt pavement. More particularly, when calcium oxide and calcium hydroxide are included in the pellets, the calcium hydroxide can impart enhanced anti-strip and improved aggregate-asphalt cement bonding, and the calcium oxide can interact with any absorbed water in order to yield additional calcium hydroxide. Accordingly, the inventive pellets can include lime in a variety of concentrations such as those recited for calcium hydroxide.

B. Binder

Generally, an embodiment of a pellet in accordance with the present invention includes an asphalt-compatible binder. By being "asphalt-compatible," it is meant to include any binder that can bind lime into a pellet for use in preparing hot mix asphalt or binding layers of asphalt together. As such, the binder does not impart any or significant detrimental characteristics to asphalt pavement so as to undermine the use of such a pellet. A wide range of asphalt-compatible binders can be employed which range from crude oil based binders through natural polysaccharide compositions as well as synthetic polymers. Some embodiments can include as little as about 0.5% binder by total weight of the pellet. For example, the pellets can include binder from about 1% to about 99%, more preferably from about 10% to about 90%, even more preferably from about 5% to about 80%, and most preferably from about 25% to about 69% or 70% by total weight of the pellet, or any amount less than 69% by weight.

In one embodiment, the asphalt-compatible binder is comprised of bitumen. Bitumen is a generic term referring to a flammable mixture of various hydrocarbon materials derived naturally or by distillation from petroleum. Usually, bitumen has a dark brown or black color, and can be present in forms that range from sticky and/or viscous oils to brittle solids such as asphalt, tars, and natural mineral waxes. Examples of substances containing bitumen include bituminous coal, tar, pitch, or Engen Bitumen 110-2™ (Engen Petroleum Limited; South Africa). When used, the pellets can include bitumen at general binder concentrations, or at a concentration ranging from about 10% to about 75%, more preferably from about 20% to about 69% or 70%, and most preferably about 25% to about 60% by total weight of the pellets. A specific example includes bitumen at 50% by total weight.

While bitumens can include elemental sulfur, it can be preferred that the binder does not include any additional sulfur such as elemental or unprocessed sulfur. For example, it can be preferred that the binder includes sulfur in an amount less than about 50% by weight of total binder, more preferably less than about 25% by weight of total binder, and most preferably with no sulfur added to the binder.

In another embodiment, the binder can be an asphalt cement. As such, examples of such asphalt cements are commonly abbreviated with the terms AC-xx. The notation "xx" in the description of AC asphalt represents a numeral related to the asphalt viscosity. Asphalts such as AC-20 and AC-10 are the preferred forms to be used as binders. Other forms of asphalt that are contemplated as constituents in binder formulations include AC-1.75, AC-2.5, AC-5, AC-30, AC-40, AC-80, and AC-120 asphalts. Also, the super pave grading system "PG-xx-xx" (e.g., PG-76-22) can be used to identify asphalt oils, wherein the "xx" notations designate temperatures in Celsius for the performance grade.

Additionally, other hydrocarbon-based materials can be used to bind lime fines. Examples of some hydrocarbon-based materials include heavy crude oil, fuel oil, tall oil pitch, and the like. Also, these materials can be added as constituents in asphalt cement formulations or bitumen compositions. For example, when tall oil pitch is used it can bind the lime fines at about 1% to 20% by weight of the pellet.

In one embodiment, the asphalt-compatible binder is comprised of lignin and/or lignosulfonate or acid thereof. Lignin is a wood constituent that is modified in a sulfite pulping process in order to obtain lignosulfonate. When used as a binder, the lignin and/or lignosulfonate can be used at the general binder compositions, or at any concentration less than about 99% by weight or greater than about 0.5% by weight, more preferably from about 0.75% to about 50%, even more preferably from about 1% to about 20%, and most preferably from about 1.25% to about 10% by weight.

In one embodiment, the asphalt-compatible binder can include a polysaccharide or modified polysaccharide. It has now been found that such polysaccharides or modified polysaccharides can be used as lime binders. Examples of polysaccharide or modified polysaccharide binders include starch, gelatinized starch, celluloses such as carboxymethylcellulose, and liquid modified starches obtained from mashing and brewing processes such as Brewex™ (Mars Mineral; Mars, Pa.).

In another embodiment, tannin liquor compositions can be used as an asphalt-compatible binder. Such tannin liquors can be obtained from processes used to convert animal skin into leather, but can also include large polyphenolic compounds. For example, a tannin liquor can include a vegetable tannin such as TAC™ (Mars Mineral; Mars, Pa.).

In another embodiment, collagen or collagen derivatives can be used as an asphalt-compatible binder. Such collagen derivatives particularly suitable for preparing lime pellets can be obtained from leather production waste, wherein the collagen or derivative thereof has been reduced to polypeptides. For example, the collagen derivatives can include Collagen $CH_2$™ (Mars Mineral; Mars, Pa.).

In another embodiment, a beet molasses derivative can be used as an asphalt-compatible binder. Usually, such a beet molasses derivative has a reduced sugar content, as the sugar has been previously extracted. An example of such a reduced-sugar beet molasses is Molex™ (Mars Mineral; Mars, Pa.).

In another embodiment, latex can be used as an asphalt-compatible binder, and/or used as an adhesive additive. In part, the benefits arise from the composition of latex, which includes an emulsion of a synthetic rubber or plastic obtained by polymerization. Also, the benefits may be realized for the same reasons latex is used in coatings, paints, and adhesives. When used as a binder, latex can be used within the general binder concentrations. Alternatively, when latex is used as an adhesive additive by being combined with bitumen or another binder, it can be used at less than about 30% by weigh of the pellet, more preferably less than about 20% by weight, and most preferably less than 10% by total weight.

In another embodiment, a polymer can be used as an asphalt-compatible binder and/or adhesive additive. Polymers have been previously used as asphalt additives or conditioners, and are typically classified as elastomers or plastomers. It has now been found that such polymers can be used as lime binders so as to provide an asphalt-compatible pellet. Elastomers include copolymers of styrene and butadiene, styrene-butadiene diblock, styrene-butadiene-styrene triblock or radial, styrene isoprene, styrene ethylbutylene, styrene butadiene rubber latex, polychloroprene latex, polyisoprene, and crumb rubber modifier. Plastomers include polyethylene vinyl acetate, polyethylene vinyl alcohol, polyethylene acetate, polyethylene and its derivatives, and various compounds based on polypropylene. Additionally, other types of polymers that can be used include acrylic polymers such as polymethylmethacrylate and polyethylmethacrylate, silicon-based polymers such as polydimethylsiloxane, and the like. When used as a binder, a polymer can be used at the general binder concentrations. Alternatively, when such a polymer is used as an adhesive additive, it can be used at less than about 30% by weigh of the pellet, more preferably less than about 20% by weight, and most preferably less than 10% by total weight.

Further, various other compounds can be used as, or with, asphalt-compatible binders. Accordingly, adhesive additives can either be used as the binder or an additive. Some examples of such adhesive additives include high temperature silicones, which are stable at high temperatures. These materials can bind lime into pellets, or complement another binder such as bitumen. Also, silicon-based polymers, methyltrimethoxysilane, and trimethoxysilyl compounds can be similarly used.

Additionally, various combinations of the foregoing binders can be employed in manufacturing a lime-based pellet. As such, the properties provided by different properties can be combined so as to form a lime-based pellet that is compatible with asphalt, and can improve the physical properties thereof.

C. Solvents

In one embodiment, it can be beneficial to use a solvent during the manufacture of lime-based pellets. In part, the solvent can provide for enhanced mixing or interactions between the lime and binder. Also, the solvents can be used in order to suspend at least one of the ingredients so as to enhance its handling and processing ability. For example, it can be beneficial to pre-treat the powdered lime with a solvent so that the problems associated with airborne particulates can be avoided.

When the binder is water-soluble, it can be beneficial to suspend or dissolve the binder in water so that it can be thoroughly and homogeneously combined with the lime fines. Also, water can provide a medium for transporting and handling the lime fines so as to prevent or limit the problems associated with such fine particulates. After adequate mixing, water can be blown off or evaporated so that the binder-lime mixture can be further processed.

Alternatively, when the binder is hydrophobic, it can be beneficial to suspend or dissolve the binder and/or lime in an organic solvent. This can facilitate combining the binder with the lime during some of the various methods for manufacturing the lime. In some instances, portions of the organic solvent can be retained in the pellet as an additional conditioner or plasticizer for the binder. Otherwise the organic solvent can be blown off, especially when a volatile solvent such as ethanol or isopropanol is used. Some examples of organic solvents include toluene, hexane, aliphatic petroleum distillate, alicyclic hydrocarbons, aromatic hydrocarbons, stoddard solvents, acetone, ethanol, isopropanol, and the like.

D. Additives

The lime-based pellets in accordance with the present invention can include a variety of additional additives for the finished hot mix asphalt. One such additive can include a structural additive such as sand, silica, fly ash, ceramic particles, glass particles, clay particles, pozzolanic materials, or other filler materials.

Another type of additive includes an agent that can impart a color to the lime-based pellet. For example, carbon black and/or manganese oxide can be included so as to impart a dark or black color to the pellet.

An additional type of additive includes salts which can interact with many of the components in the lime-based pellet and enhance the long-term characteristics of the pellet and asphalt pavement. In fact, some of the salts can act to enhance the binders when processed with the lime fines. Examples of such salts include sodium chloride, calcium chloride, potassium chloride, magnesium sulfate, manganese dioxide, manganese oxide, and the like. The salt additive can be present at a concentration ranging from about 0.1% to about 20% by weight, more preferably from about 0.25% to about 15%, and most preferably from about 0.5% to about 10% by weight.

In order to change the rheology of the compositions that are used in preparing the lime-based pellet, a rheology-modifier can be used. When a shear force is applied to a composition having a rheology-modifier, it can behave in a non-Newtonian manner so that the viscosity decreases by the applied force. This can be beneficial for homogeneously distributing fines throughout a composition during the mixing, and then inhibiting or decreasing the settling of the fines after the composition is allowed to set. Also, rheology-modifiers can be lime binders. Examples of such rheology-modifiers include polysaccharides such as caroboxymethyl-cellulose, other celluloses, amyloses, inulins, chitins, chitosans, amylopectins, glycogens, pectins, hemicelluloses, glucomannans, galactoglucomannans, xyloglucans, methyl-glucuronoxylans, arabinoxylans, methylglucuronoarabinoxylans, glycosaminoglycans, chondroitins, hyaluronic acids, alginic acids, and the like.

IV. Manufacturing Lime Pellets

Figure 2:
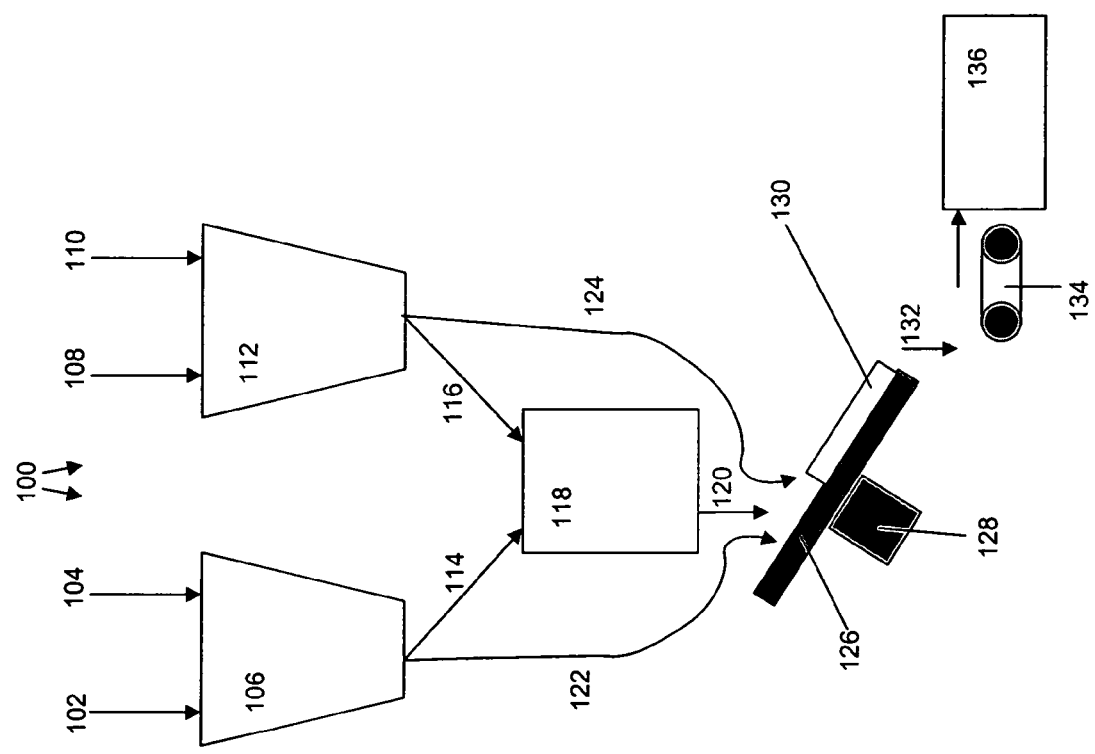
FIG. 2 is a schematic representation that illustrates an embodiment of a pelleting system and process for preparing lime-based pellets.
Figure 3:
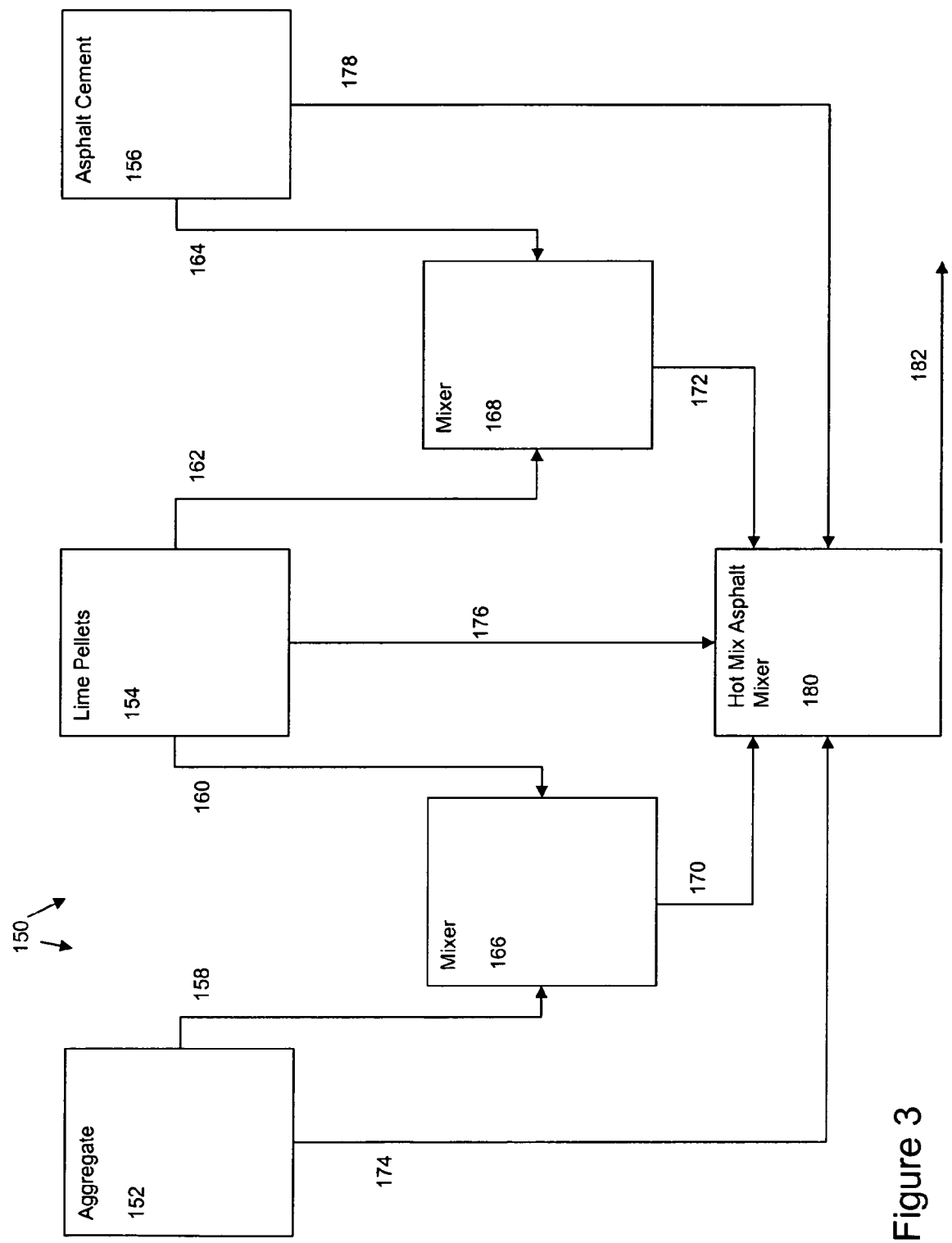
FIG. 3 is a schematic representation that illustrates an embodiment of a system and process for conditioning asphalt during the manufacture of hot mix asphalt.

FIGS. 1-3 illustrate various schematic diagrams of embodiments of processing systems and equipment that can be used during the formation of a lime-based pellet and conditioned hot mix asphalt. It should be recognized that these are only examples or schematic representations of processing systems and equipment, and various modifications can be made in order to prepare the inventive pellets and asphalt pavements. Also, the schematic representations should not be construed in any limiting manner to the arrangement, shape, size, orientation, or presence of any of the features described in connection the figures. With that said, a more detailed description of examples of some of the systems and equipment that can prepare the lime-based pellets as well as conditioned asphalt pavement in accordance with the present invention is provided below.

FIG. 1 depicts an embodiment of a pelleting system 10 in accordance with the present invention. Such a pelleting system 10 includes a first mixer 16, second mixer 22, extruder 28, cooler or dryer 36, pelletizer 38, conditioning apparatus 40, and pellet collector 42.

The first mixer 16 is configured to receive a first feed of materials through a first feed line 12 and a second feed of materials through a second feed line 14. The first mixer 16 processes the materials supplied by the first line 12 and second line 14 into a first mixture 24. Similarly, an optional second mixer 22 has a third feed line 18 and a fourth feed line 20 that supplies the material to be mixed into a second mixture 26. The first mixer 16 and/or the second mixer 18 can be configured for variable speed and shear mixing at elevated temperatures.

For example, the first feed line 12 can supply the calcium hydroxide fines with or without a solvent, and the second feed line 14 can supply the binder (such as bitumen) with or without an organic solvent. Additionally, the third feed line 18 can supply the calcium oxide fines with or without a solvent, and the fourth feed line 20 can supply the binder (such as SBS) with or without a solvent. The second mixer 22 is optional because it can be preferable to prepare lime-based pellets with only calcium hydroxide or only calcium oxide. Additionally, other processing schemes can render the second mixer as optional.

Additionally, the first mixture 24 and the second mixture 26 are supplied into the extruder 28, and mixed into a composition capable of being extruded. Additionally, while being mixed, the composition can be moved through the extruder 28 so as to pass by heating elements (not shown). The heating elements can provide for a ramped increase or parabolic change in temperature in order to gradually remove the solvents and/or increase the liquidity of the binder before extrusion.

As the composition moves to the end of the extruder 28, it passes through the die head 30 before being extruded through the die opening 32. The die head 30 and die opening 32 can be configured into any shape or arrangement so long as to produce a pelletable extrudate 34. In another embodiment, the extrudate 34 can itself form pellet-sized spheroids by having a plurality of die openings 32 in the die head 30.

When the extrudate 34 leaves the die opening 32, it can be too moist to be pelleted. As such, it can be beneficial to dry the extrudate 34 in an optional dryer 36 before being pelleted to remove any solvent. The dried extrudate can have a moisture content below about 15%, more preferably below 10%, and most preferably below about 5% before being pelleted.

On the other hand, the extrudate 34 may be at an elevated temperature from the extruding process so as to have thermoplastic characteristics (i.e., being in a flowable or gummy state). As such, it can be beneficial to cool the extrudate 34 before pelleting. For example, the extrudate can be cooled to a temperature of less than 35° C., more preferably a temperature less than 30° C., and most preferably less than 25° C. in the cooling apparatus 36 before being pelleted.

After the extrudate 34 is dried or cooled, it is supplied to the pelletizer 38. The pelletizer 38 can be configured for cutting the extrudate 34 into a variety of shapes and sizes. For example, the extrudate 34 can be cut into pellets having a diameter range from about 1.5 mm (about 0.05 inches) to about 2.54 cm (about 1 inch), more preferably in a range of from about 2 mm (about 0.08 inches) to about 2 cm (about 0.8 inches), even more preferably about 3 mm (about 0.1 inches) to about 1.5 cm (about 0.6 inches), and most preferably in a range of from about 6 mm (about 0.2 inches) to about 1 cm (about 0.4 inches).

The pellets can then be supplied from the pelletizer 38 to an optional conditioning assembly 40, which can condition the pellets for storage in a pellet collector 42, or for further processing. For example, the conditioning assembly 40 can be configured to harden the pellets, apply a water-resistant coating such as a water-resistant polymer or a wax, or apply a lubricious coating so as to reduce the friction between the pellets.

Referring now to FIG. 2, one embodiment of a pelleting system 100 is illustrated. As such, a lime feed line 102 is introduced into a lime vessel 106, where it can be mixed with an optional conditioner such as a solvent, rheology-modifier, additive, or other particulate filler material that is supplied by the optional feed line 104. The lime vessel 106 can include a heating element, mixing equipment, or other processing equipment for conditioning the lime fines. Otherwise, the lime fines can be supplied into the lime vessel 106 so that it can be precisely metered during the pelleting process.

Additionally, a binder feed line 108 is introduced into a binder vessel 112, where it can be mixed with an optional conditioner such as a solvent, rheology-modifier, other particulate or conditioning material, or adhesive additive supplied by the optional feed line 110. Also, the binder vessel 112 can be configured to accurately meter the binder composition for preparing the pellets. Moreover, the binder vessel 112 can be substantially similar to the lime vessel 106.

In one embodiment, when the lime is ready for further processing, it is supplied into an optional mixer 118 via line 114 and combined with binder provided by line 116. The mixer 118 can then mix the lime and the binder together into a substantially homogeneous or uniform mixture.

A supply of a lime-binder composition can then be provided from the mixer 118 to a disc pelletizer 126 via line 120. Alternatively, a supply of lime can be provided by the lime vessel 106 directly to the disc pelletizer 126 via line 122. In any event, the lime composition resides on the disc pelletizer 126, which is rotated by a drive system 128, until a supply of binder is provided from the binder vessel 112 via line 124. The binder is applied drop-wise or by a slow flowing line to the lime on the disc pelletizer 126. As the binder contacts the lime, a small pellet is formed. Thus, by providing a plurality of binder droplets or a binder line to the lime, the pellets can individually form, or optionally combine, until large enough to be removed through the hood 130. After the pellets are formed, a pellet flow 132 can supply the pellets onto a conveyor 134 that transports them to storage 136.

In an alternative embodiment, the lime and/or binder can be supplied directly to the disc pelletizer 126 without any processing, mixing, or conditioning. As such, the lime can be supplied via line 122 and the binder can be supplied by line 124, which then are combined on the disc pelletizer 126. This can greatly simplify the pelleting process.

Additionally, various other methods for preparing pellets can be used to manufacture the lime-based pellets in accordance with the present invention. For example, lime can be mixed with a binder and prilled through a prilling tower, which drops the lime-binder mixture through water in order to form the pellets. Also, the lime-binder mixture can be processed through a pastillator machine which forms pastilles on a revolving belt that are then scrapped off.

V. Conditioning Hot Mix Asphalt

In one embodiment, the lime-based pellets can be used in modifying asphalt pavement. More particularly, the lime-based pellets can be used for modifying asphalt pavement by being added to at least one of the ingredients of hot mix asphalt during the manufacture thereof.

Accordingly, FIG. 3 includes a schematic diagram depicting an embodiment of a system and process 150 for conditioning asphalt pavement. Such a conditioning system and process 150 includes an aggregate supply 152, a lime pellet supply 154, and an asphalt cement supply 156. Additionally, the conditioning system and process 150 includes a means for combining lime pellets with at least one of the aggregates such as sand, asphalt cement, or even with the hot mix asphalt itself.

In one embodiment, the aggregate supply 152 supplies aggregate material to a mixing vessel 166 via line 158. Additionally, the lime pellet supply 154 supplies lime pellets to the mixing vessel 166 via line 160. As such, the aggregate and lime pellets are mixed together in the mixing vessel 166. The lime pellets and aggregate can each be accurately measured so that a predetermined amount of aggregate and lime pellets can be supplied into the hot mix asphalt. For example, the lime can be metered and combined with a known amount of aggregate so that the lime is present from about 0.05% to about 10% by weight of aggregate, more preferably from about 0.1% to about 5% by weight, and most preferably about 0.5% to about 2.5% by weight of aggregate.

In one embodiment, the asphalt cement supply 156 supplies the asphalt cement such as bitumen to a second mixing vessel 168 (e.g., vortex mixer) via line 164. Optionally, the asphalt cement supply 156 is contained within a vessel, which may be equipped with heating elements (not shown) in order to heat the asphalt cement into a liquefied state in preparation for being combined with the lime pellets. Additionally, the lime pellet supply 154 supplies lime pellets to the second mixing vessel 168 via line 162. As such, the asphalt cement and lime pellets are mixed together in the second mixing vessel 168, which can be equipped with heating elements (not shown) so that the asphalt cement is heated to a temperature sufficient for dissolving the lime pellets. This includes increasing the temperature of the asphalt cement past its melting point and past the melting or dissolving point of the lime pellet. For example, the second mixing vessel 168 can be heated to a dissolving temperature of greater than about 125° C., more preferably greater than about 150° C., even more preferably greater than about 200° C., and most preferably greater than about 250° C.

In one embodiment, the second mixing vessel 168 (e.g., vortex mixer) can be configured for rapidly increasing the temperature of the lime pellets. As such, the lime pellets can be rapidly dissolved upon being introduced into the second mixing vessel 168 and upon contacting or being entrained within a liquefied asphalt cement composition. For example, a second mixing vessel 168 can rapidly heat the lime pellets so that they are substantially dissolved within a timeframe of less than about 1 minute, more preferably less than about 30 seconds, even more preferably less than about 20 seconds, and most preferably less than about 10 seconds. Additionally, in certain embodiments it can be preferred that the lime pellets dissolve within about 5 seconds to about 15 seconds.

In any event, the amount of asphalt cement and lime pellets that are mixed can be predetermined so that the resulting hot mix asphalt contains the proper amount of each component. Usually, it is preferred that the lime is present in an amount greater than 10% by weight of asphalt cement, more preferably between about 10% to about 30% by weight, and most preferably between about 12% to about 28% by weight of asphalt cement.

In one embodiment, the aggregate-lime mixture can be supplied from the mixing vessel 166 to the hot mix vessel 180 (e.g., pugmill, drum mixer, etc.) via line 170. Additionally, asphalt cement can be transported to the hot mix vessel 180 directly from the asphalt cement supply 156 via line 178. As such, the lime pellets and aggregate can be added directly into liquefied asphalt cement and mixed so that the resulting hot mix asphalt 182 supplied from the hot mix vessel 180 has a substantially homogeneous or uniform composition.

In order to enhance mixing, the hot mix vessel 180 (e.g., pugmill, drum mixer, etc.) can be equipped with a heating element so that the temperature is sufficiently high for maintaining a liquid continuous phase comprised of asphalt cement. Also, the temperature should rapidly dissolve the lime pellets so that the lime component can be evenly distributed throughout the hot mix asphalt, wherein the temperature can be substantially the same as described-above with respect to the second mixer 168 (e.g., vortex mixer) so as to achieve dissolution of the pellets within the foregoing timeframes.

In one embodiment, the aggregate can be supplied from the aggregate supply 152 directly into the hot mix vessel 180 (e.g., pugmill, drum mixer, etc.) via line 174. Additionally, the asphalt-lime mixture prepared in the second mixer 168 (e.g., vortex mixer) can be transported directly into the hot mix vessel 180 via line 172. Usually, the liquefied asphalt-lime mixture is added to the hot mix vessel 180 prior to the addition of aggregate. In any event, the aggregate is mixed into the liquid asphalt-lime mixture under heat so as to form hot mix asphalt 182 with a substantially homogeneous or uniform composition.

In one embodiment, the asphalt cement supply 156 supplies liquefied asphalt cement directly into the hot mix vessel 180 via line 178. The hot mix vessel 180 heats the asphalt cement so as to maintain or obtain liquid asphalt having the foregoing temperatures for providing the same lime pellet dissolution rates. Additionally, the lime pellet supply 154 supplies the lime pellets directly into the liquid asphalt within the hot mix vessel 180 via line 176. After the lime pellets have dissolved into the liquefied asphalt, aggregate from the aggregate supply 152 can be added directly into the hot mix vessel 180 via line 174 and mixed with the liquid asphalt-lime composition. After adequate mixing, a hot mix asphalt 182 is ready for use or further processing.

In view of the foregoing system and process 150 for manufacturing and conditioning hot mix asphalt, various other modifications and additions can be made under the current inventive concept. As such, additional supplies of sand, fly ash, adhesive additives, other fillers, and any other additive useful for preparing hot mix asphalt can be used and added to the system and process 150. Thus, many variations can be made to the process for using lime pellets for manufacturing and conditioning asphalt pavement.

VI. Binding Asphalt Layers

In one embodiment, the lime pellets can be used for enhancing the adhesion between two layers of asphalt pavement. As such, the lime pellets can be applied over the surface of a first layer of asphalt, and then the lime pellets are coated with a second layer of asphalt.

Figure 4:
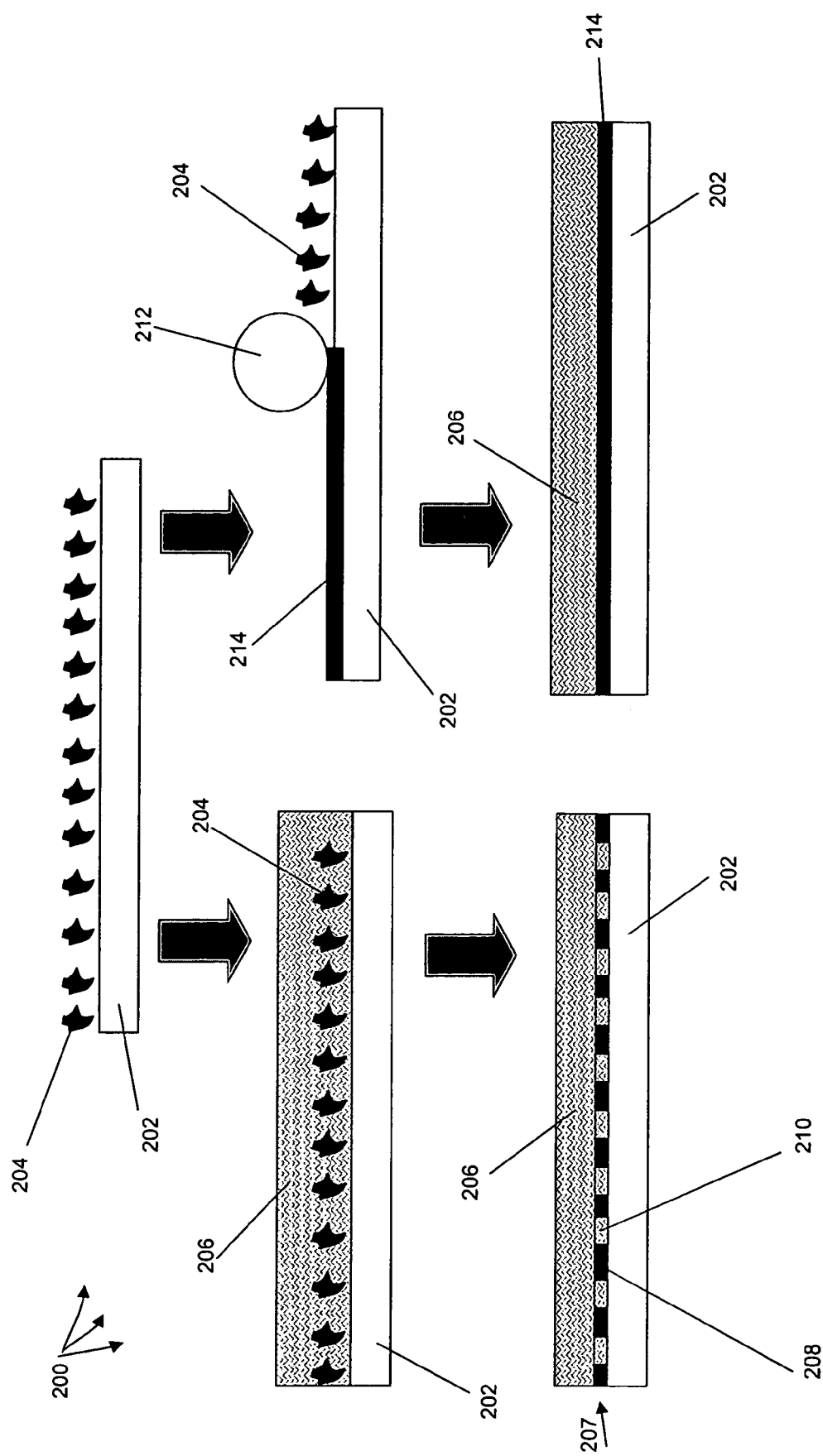
FIG. 4 is a schematic representation that illustrates embodiments of asphalt paving with lime pellets.

With reference now to FIG. 4, a schematic diagram illustrates embodiments of a bonding process 200 for binding different layers of asphalt pavement together. The bonding process 200 can be performed over an old or new layer of asphalt pavement 202. The asphalt pavement layer 202 can be an old layer of asphalt pavement that needs a topcoat or surfacing, or a new layer that has been recently deposited. In any event, the lime pellets 204 are applied over the asphalt pavement layer 202.

The lime pellets 204 can be applied to the asphalt pavement layer 202 by a variety of processes. Some of the exemplary processes include dumping the pellets into piles and raking or otherwise distributing the individual pellets substantially evenly across the top of the asphalt pavement layer 202. Alternatively, the lime pellets 204 can be substantially evenly sprinkled over the asphalt pavement layer 202. The amount of lime pellets 204 over a given area can be varied from a sparse coating where the pellets are spread apart without being in contact with each other through a dense coating where substantially all of the pellets are in contact with each other.

In one embodiment, after the lime pellets 204 have been applied to the first asphalt pavement layer 202, a layer of liquid asphalt cement 206 can be sprayed or otherwise deposited over the pellets 204 and first asphalt layer 202. As such, the liquid asphalt cement 206 can coat the lime pellets 204 and fill any spaces therebetween. Also, the thickness of the liquid asphalt layer 206 can be thick enough to cover the pellets 204 and first asphalt layer 202.

Accordingly, the liquid asphalt can at least partially melt the lime pellets 204 and form a bonding layer 207. The bonding layer 207 can be comprised of pellet portions 208 and asphalt cement portions 210. As such, the pellet portions 208 can impart the lime fines into the asphalt cement portions 210 so as to enhance the bonding between the first asphalt layer 202 and the second asphalt layer 206. Also, since the second asphalt layer 206 is usually applied in a heated and liquid form, the lime fines can also be distributed and suspended into the second asphalt layer 206. Thus, the lime pellets 204 can be used in facilitating and enhancing the bonding between different layers of asphalt.

In another embodiment, after the lime pellets 204 have been applied to the first asphalt pavement layer 202, a heavy roller 212 can be used to smash or compact the lime pellets 204 into a lime layer 214. Alternatively, heat with or without any rolling or compacting devices 212 can be used to flatten the pellets 204 and/or form the lime layer 214. As such, after a lime layer 214 is formed, the second asphalt layer 206 can be deposited thereon. Thus, the lime layer 214 can be used to enhance the bonding between the first asphalt layer 202 and the second asphalt layer 206. While embodiments of processes for adhering asphalt layers together with lime pellets have been depicted and described, it should be appreciated that other variations to such processes can be made within the scope of the invention.

EXAMPLES

Example 1

A lime-based pellet is prepared using a disc pelletizer and associated method. Briefly, a supply of substantially pure calcium hydroxide fines is added to a rotating disc of a disc pelletizer in an amount that enables pellet formation. Liquefied bitumen is then added drop-wise to the calcium hydroxide fines. Pellets are formed by bitumen droplets repeatedly contacting the calcium hydroxide fines, which can spill over edge of the pelletizer when reaching an adequate size. The average size of the pellets is expected to be 0.62 cm with a composition of 31% calcium hydroxide and 69% bitumen.

Example 2

A series of pellets having varying compositions are prepared in accordance with the protocol of Example 1 with minor modifications. Briefly, varying compositions of liquefied hydrophobic binder are added drop-wise to the lime fines (calcium hydroxide and/or calcium oxide). The feed rates of lime and/or binder are modified in order to alter pellet sizes and compositions. The expected shape, size (average diameter), and compositions of the pellets are described in Table 1 as follows:

TABLE 1

| Component | % (by weight) |
|---|---|
| PELLET 1 | |
| Spheroid (0.6 cm) | |
| Calcium hydroxide | 41 |
| Calcium oxide | 10 |
| Bitumen | 40 |
| Manganese oxide | 9 |
| PELLET 2 | |
| Spheroid (0.35 cm) | |
| Calcium hydroxide | 31 |
| Calcium oxide | 5 |
| Bitumen | 60 |
| Calcium Chloride | 1 |
| Polymethylmethacrylate | 3 |
| PELLET 3 | |
| Spheroid (0.5 cm) | |
| Calcium hydroxide | 31 |
| Bitumen | 50 |
| Calcium chloride | 1.5 |
| Sodium chloride | 0.5 |
| Polymethylmethacrylate | 17 |
| PELLET 4 | |
| Spheroid (0.8 cm) | |
| Calcium hydroxide | 60 |
| Bitumen | 35 |
| Calcium chloride | 1 |
| Manganese oxide | 3 |
| Polyethylmethacrylate | 1 |
| PELLET 5 | |
| Spheroid (1.15 cm) | |
| Calcium oxide | 31 |
| Bitumen | 60 |
| Polymethylmethacrylate | 9 |
| PELLET 6 | |
| Spheroid (0.2 cm) | |
| Calcium oxide | 26 |
| Zero Pen AC | 69 |
| Manganese oxide | 4 |
| Carbon black | 1 |
| PELLET 7 | |
| Spheroid (0.95 cm) | |
| Calcium oxide | 60 |
| AC-40 | 20 |
| Bitumen | 15 |
| Styrene-butadiene-styrene | 5 |
| PELLET 8 | |
| Spheroid (1.14 cm) | |
| Calcium oxide | 45 |
| Bitumen | 20 |
| PG-76-22 | 23 |
| Aliphatic petroleum distillate | 2 |
| Manganese oxide | 5 |
| Calcium chloride | 2 |
| Methyltrimethoxysilane | 1 |
| Fly ash | 2 |
| PELLET 9 | |
| Spheroid (2 cm) | |
| Calcium hydroxide | 50 |
| Bitumen | 50 |
| PELLET 10 | |
| Spheroid (0.4 cm) | |
| Calcium hydroxide | 40 |
| Bitumen | 40 |
| Styrene-butadiene-styrene | 20 |
| PELLET 11 | |
| Spheroid (0.5 cm) | |
| Calcium hydroxide | 45 |
| Bitumen | 45 |
| Latex | 10 |
| PELLET 12 | |
| Spheroid (0.3 cm) | |
| Calcium hydroxide | 42 |
| Bitumen | 42 |
| polyethylene vinyl acetate | 16 |

Example 3

A series of pellets having varying compositions are prepared in accordance with the protocol of Example 1 with minor modifications. Briefly, varying compositions of liquefied hydrophilic binder are added drop-wise to the lime fines (calcium hydroxide and/or calcium oxide). The feed rates of lime and/or binder are modified in order to alter pellet sizes and compositions. The expected shape, size (average diameter), and compositions of the pellets are described in Table 2 as follows:

TABLE 2

| Component | % (by weight) |
|---|---|
| PELLET 13 | |
| Spheroid (1.2 cm) | |
| Calcium hydroxide | 80 |
| Lignosulfonate | 5 |
| Manganese oxide | 15 |
| PELLET 14 | |
| Spheroid (0.35 cm) | |
| Calcium hydroxide | 30 |
| Calcium oxide | 30 |
| Lignosulfonate | 35 |
| Manganese oxide | 4 |
| Carbon black | 1 |
| PELLET 15 | |
| Spheroid (0.25 cm) | |
| Calcium hydroxide | 95 |
| Lignosulfonate | 5 |
| PELLET 16 | |
| Spheroid (0.45 cm) | |
| Calcium hydroxide | 61 |
| Calcium oxide | 21 |
| Lignosulfonate | 7 |
| Manganese oxide | 4 |
| Fly ash | 5 |
| Carbon black | 2 |
| PELLET 17 | |
| Spheroid (0.2 cm) | |
| Calcium hydroxide | 91 |
| Lignosulfonate | 9 |
| Fly ash | 5 |
| Calcium chloride | 3 |
| Carbon black | 2 |
| PELLET 18 | |
| Spheroid (2.3 cm) | |
| Calcium hydroxide | 98 |
| Lignosulfonate | 1 |
| Manganese oxide | 1 |
| PELLET 19 | |
| Spheroid (1.5 cm) | |
| Calcium hydroxide | 70 |

TABLE 2-continued

| Component | % (by weight) |
|---|---|
| Lignosulfonate | 10 |
| Manganese oxide | 20 |
| PELLET 20 | |
| Spheroid (1.2 cm) | |
| | |
| Calcium hydroxide | 80 |
| Lignosulfonate | 5 |
| Manganese oxide | 15 |
| PELLET 21 | |
| Spheroid (1.7 cm) | |
| | |
| Calcium hydroxide | 85 |
| Lignosulfonate | 2.5 |
| Manganese oxide | 12.5 |
| PELLET 22 | |
| Spheroid (2.4 cm) | |
| | |
| Calcium hydroxide | 90 |
| Lignosulfonate | 0.5 |
| Manganese oxide | 9.5 |
| PELLET 23 | |
| Spheroid (0.3 cm) | |
| | |
| Calcium hydroxide | 61 |
| Calcium oxide | 20 |
| Lignosulfonate | 16 |
| Carbon black | 3 |

Example 4

A lime-based pellet is prepared using a disc pelletizer and associated method as described in Example 1. Briefly, a supply of lime fines combined with manganese oxide is added to the rotating disc of a disc pelletizer, and Elmer's™ glue (Elmer's Products, Inc.; Columbus, Ohio) is added drop-wise. Pellets are formed by contacting the glue with the lime fines. The average size of the pellets is expected to be 0.95 cm with a composition of 90% lime fines, 0.5% Elmer's glue, and 9.5% manganese oxide.

Example 5

A lime-based pellet is prepared using a disc pelletizer and associated method as described in Example 1. Briefly, a supply of lime fines combined with manganese oxide is added to the rotating disc of a disc pelletizer, and liquefied brewer's starch is added drop-wise. Pellets are formed by contacting the brewer's with the lime fines. The average size of the pellets is expected to be 1.27 cm with a composition of 97% lime fines, 1% brewer's starch, and 2% manganese oxide.

Example 6

A series of pellets having varying compositions are prepared in accordance with the protocol of Example 1 with minor modifications. Briefly, varying compositions of tall oil pitch are combined with lime fines (calcium hydroxide and/or calcium oxide). The expected shape, size (average diameter), and compositions of the pellets are described in Table 3 as follows:

TABLE 3

| Component | % (by weight) |
|---|---|
| PELLET 24 | |
| Spheroid (2 cm) | |
| Calcium hydroxide | 98 |
| Tall oil pitch | 1 |
| Manganese oxide | 1 |
| PELLET 25 | |
| Spheroid (1.3 cm) | |
| Calcium hydroxide | 90 |
| Tall oil pitch | 5 |
| Styrene-butadiene-styrene | 3 |
| Manganese oxide | 2 |
| PELLET 26 | |
| Spheroid (1.5 cm) | |
| Calcium hydroxide | 80 |
| Tall oil pitch | 10 |
| Styrene-butadiene rubber | 5 |
| Phosphorus oxide | 2 |
| Manganese oxide | 3 |
| PELLET 27 | |
| Spheroid (0.8 cm) | |
| Calcium hydroxide | 70 |
| Tall oil pitch | 15 |
| Fly ash | 8 |
| Potassium chloride | 5 |
| Manganese oxide | 2 |
| PELLET 28 | |
| Spheroid (0.5 cm) | |
| Calcium hydroxide | 60 |
| Tall oil pitch | 20 |
| Styrene-butadiene-styrene | 3 |
| Silica | 5 |
| Sand | 2 |
| Sodium chloride | 5 |
| Manganese oxide | 5 |

Example 7

The rate of dissolution of the lime-based pellets formed with a hydrophobic binder prepared in accordance to Example 2 is determined by addition to mineral oil (Sigma-Aldrich) heated to 150° C. Briefly, a pellet having a dark color is placed into 250 ml of transparent mineral oil in a 500 ml open-mouth flask and stirred with a magnetic stir bar under heat. The pellet is observed to decrease in size until it is unobservable. When the pellet is unobservable, it is considered to be substantially dissolved. The expected time (seconds) in order for each pellet to become substantially dissolved is provided in Table 4 as follows:

TABLE 4

| Pellet | Dissolution Rate (s) |
|---|---|
| 1 | 6 |
| 2 | 11 |
| 3 | 16 |
| 4 | 12 |
| 5 | 19 |
| 6 | 27 |
| 7 | 8 |
| 8 | 12 |
| 9 | 7 |
| 10 | 12 |
| 12 | 14 |

Example 8

The rate of dissolution of the lime-based pellets formed with a hydrophilic binder prepared in accordance to Example 3 is determined by addition to water heated to 100° C. (212° F.). The expected time (seconds) in order for each pellet to become substantially dissolved in Table 5 as follows:

TABLE 5

| Pellet | Dissolution Rate (s) |
|---|---|
| 13 | 10 |
| 14 | 8 |
| 15 | 16 |
| 16 | 21 |
| 17 | 17 |
| 18 | 5 |
| 19 | 9 |
| 20 | 7 |
| 21 | 6 |
| 22 | 5 |
| 23 | 12 |

Example 9

The stability of pellets having a composition according to Pellet 11 of Example 2 is determined to assess resistance to degradation and agglomeration. Briefly, pellets having the characteristics of Pellet 11 are placed into a 500 ml open-mouth flask and stored in ambient conditions. The resistance to agglomeration and degradation are observed periodically up to 6 months. It is expected that the pellets will not substantially degrade or agglomerate at any time up to the 6-month period.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pellet for use in asphalt applications, the pellet comprising:
   lime fines at greater than about 1% by total weight of the pellet; and
   a hydrophobic binder binding the lime fines into the pellet at about 0.5% to about 69% by total weight of the pellet, said hydrophobic binder being comprised of at least one of an elastomer polymer, a plastomer polymer, manganese oxide, tall oil pitch, or asphalt cements, the binder characterized by less than about 50% by weight of total binder being sulfur, and wherein the pellet is characterized as having a dimension greater than about 1.5 mm.

2. A pellet as in claim 1, wherein the hydrophobic binder is further comprised of at least one of bitumens, heavy crude oil, fuel oil, acrylic polymers, polymers comprised of silicon, or latexes.

3. A pellet as in claim 2, wherein the hydrophobic binder is further comprised of an additive, the additive being present at less than 30% by total weight of the pellet and comprised of at least one of aliphatic petroleum distillate, latexes, calcium chloride, manganese oxide, styrene-butadiene-styrenes, styrene-etheylene/butylene-styrenes, styrene isoprenes, styrene ethylbutylenes, styrene butadiene rubber latexes, polychloroprene latexes, polyisoprenes, polyethylene acetates, polyethylenes, polypropylenes, polmers comprised of silicones, or polydimethylsiloxanes.

4. A pellet as in claim 3, wherein the lime consists essentially of calcium hydroxide present in an amount greater than 31% by weight.

5. A pellet as in claim 3, wherein the lime consists essentially of calcium oxide present in an amount greater than 31% by weight.

6. A pellet for use in asphalt applications, the pellet comprising:
   lime fines at a concentration greater than about 31% by total weight of the pellet; and
   a hydrophobic binder binding the lime fines into the pellet at about 0.5% to about 69% by total weight of the pellet, said hydrophobic binder being comprised of at least one of an elastomer polymer, plastomer polymer, manganese oxide, tall oil pitch, or asphalt cements, wherein the pellet is characterized as having a dimension greater than about 1.5 mm.

7. A pellet as in claim 6, wherein the hydrophobic binder is further comprised of at least one of a bitumen, heavy crude oil, fuel oil, or latexes.

8. A pellet as in claim 7, wherein the pellet is configured to dissolve within about 30 seconds after being introduced within liquid asphalt.

9. A pellet as in claim 8, wherein the pellet is configured to dissolve within about 15 seconds after being introduced into the liquid asphalt.

10. A pellet as in claim 8, wherein the lime consists essentially of calcium oxide.

11. A pellet as in claim 8, wherein the lime consists essentially of calcium hydroxide.

12. A pellet for use in asphalt applications, the pellet comprising:
   lime fines at greater than about 1% by total weight of the pellet; and
   a hydrophobic binder binding the lime fines into the pellet at about 0.5% to about 69% by total weight of the pellet to form a storage-stable pellet that does not substantially degrade or agglomerate with adjacent lime pellets under ambient conditions, wherein the pellet is configured to dissolve within 30 seconds after being placed in liquefied asphalt heated to greater than about 150° C.

13. A pellet as in claim 12, wherein the pellet has a dimension from about 1.5 mm to about 2.5 cm.

14. A pellet as in claim 13, wherein the hydrophobic binder is comprised of at least one of bitumens, tall oil pitch, asphalt cements, latexes, manganese oxide, acrylic polymers, polymers comprised of silicon, polymers comprised of silicones, plastomer polymers, or elastomer polymers.

15. A pellet as in claim 14, wherein the lime is present at greater than 31% by weight of the pellet and consists essentially of calcium hydroxide ($Ca(OH)_2$), wherein the storage-stable pellet does not substantially agglomerate within about 6 months of being stored in contact with lime pellets.

16. A pellet as in claim 14, wherein the lime is present at greater than 31% by weight of the pellet and consists essentially of calcium oxide (CaO), wherein the storage-stable pellet does not substantially agglomerate within about 6 months of being stored in contact with lime pellets.

17. A pellet as in claim 14, wherein the storage-stable pellet does not substantially agglomerate within about 90 days.

18. A method of manufacturing the lime pellet of claim 1, the method comprising:
   mixing the lime fines with the hydrophobic binder; and
   forming pellets comprised of the lime fines and hydrophobic binder, the pellets being characterized by being storage-stable for greater than about 1 year.

19. A method as in claim 18, wherein the pellets have substantially a shape selected from the group consisting of a spheroid, pastille, cube, slate, and combinations thereof.

20. A method as in claim 19, wherein the binder is comprised of at least one of bitumen, tall oil pitch, asphalt cements, heavy crude oil, fuel oil, acrylic polymers, polymers comprised of silicon, or latexes.

21. A method as in claim 20, further comprising mixing an additional component with the lime fines and asphalt compatible binder, the additional component being at least one of a salt, rheology-modifier, sand, silica, fly ash, ceramic particles, glass particles, clay particles, pozzolanic materials, filler materials,; solvent, or color-imparting agent.

22. A pellet for use in asphalt applications, the pellet comprising:
   lime fines consisting of calcium hydroxide ($Ca(OH)_2$) or calcium oxide (CaO), wherein the lime fines are present at greater than about 1% by total weight of the pellet; and
   an asphalt-compatible binder mixed with the lime fines at about 0.5% to about 69% by total weight of the pellet, the binder characterized by less than about 50% by weight of total binder being sulfur, and wherein the pellet is characterized as having a dimension greater than about 1.5 mm.

23. A pellet as in claim 22, wherein the lime fines consist of calcium hydroxide ($Ca(OH)_2$).

24. A pellet as in claim 22, wherein the lime fines consists of calcium oxide (CaO).

25. A pellet as in claim 22, wherein the lime fines exclude limestone.

26. A pellet as in claim 22, wherein the binder is a hydrophobic binder.

27. A pellet as in claim 26, wherein the hydrophobic binder is tall oil pitch.

28. A pellet as in claim 22, wherein the binder is a lignosulphonate.

* * * * *

UNITED STATES PATENT AND TRADEMARK OFFICE
CERTIFICATE OF CORRECTION

PATENT NO. : 7,303,623 B2
APPLICATION NO. : 11/134797
DATED : December 4, 2007
INVENTOR(S) : William R. Bailey It is certified that error appears in the above-identified patent and that said Letters Patent is hereby corrected as shown below:

Column 5
Line 39, change "calcium" to --calcium oxide.--

Column 6
Line 26, change "even more preferably from about 5% to about 80%" to --even more preferably from about 15% to about 80%--

Column 7
Line 54, change "30% by weigh" to --30% by weight--

Column 8
Line 10, change "30% by weigh" to --30% by weight--

Column 9
Line 25-26, change "caroboxymethylcellulose" to --carboxymethylcellulose--
Line 44, change "connection the" to --connection with the--

Column 14
Line 51, Example 1, change "over edge" to --over the edge--

Column 19
Line 67, Claim 3, change "styrene-etheylene/butylene-styrenes" to --styrene-ethylene/butylene-styrenes--

UNITED STATES PATENT AND TRADEMARK OFFICE
CERTIFICATE OF CORRECTION

PATENT NO. : 7,303,623 B2
APPLICATION NO. : 11/134797
DATED : December 4, 2007
INVENTOR(S) : William R. Bailey It is certified that error appears in the above-identified patent and that said Letters Patent is hereby corrected as shown below:

Column 20
Line 19, Claim 21, change "materials,;" to --materials,--

Signed and Sealed this

First Day of December, 2009

David J. Kappos
*Director of the United States Patent and Trademark Office*